(12) United States Patent
Moine et al.

(10) Patent No.: US 11,320,008 B2
(45) Date of Patent: May 3, 2022

(54) METHOD FOR MEASURING WEAR OF A CLUTCH AND RELATED MAINTENANCE METHOD, ASSEMBLY COMPRISING A CLUTCH AND A WEAR MEASUREMENT DEVICE, AND VEHICLE

(71) Applicant: Volvo Truck Corporation, Gothenburg (SE)

(72) Inventors: Nicolas Moine, Communay (FR); Dan Hjalmarsson, Billdal (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/264,429

(22) PCT Filed: Aug. 1, 2018

(86) PCT No.: PCT/EP2018/070852
§ 371 (c)(1),
(2) Date: Jan. 29, 2021

(87) PCT Pub. No.: WO2020/025125
PCT Pub. Date: Feb. 6, 2020

(65) Prior Publication Data
US 2021/0310527 A1  Oct. 7, 2021

(51) Int. Cl.
*F16D 48/06* (2006.01)
*F16D 25/0635* (2006.01)

(52) U.S. Cl.
CPC ....... *F16D 48/066* (2013.01); *F16D 25/0635* (2013.01); *F16D 2500/1028* (2013.01);
(Continued)

(58) Field of Classification Search
CPC .............................................. F16D 2500/5023
See application file for complete search history.

(56) References Cited

U.S. PATENT DOCUMENTS 8,651,256 B2    2/2014  Bitzer
2017/0321765 A1  11/2017  Ruiters et al.

FOREIGN PATENT DOCUMENTS

EP    2184507 A1    5/2010
JP    11093973 A  * 4/1999  ........... F16D 48/066

OTHER PUBLICATIONS

International Search Report and Written Opinion of the International Searching Authority, PCT/EP2018/070852, dated Mar. 13, 2019, 9 pages.

* cited by examiner

*Primary Examiner* — Timothy Hannon
(74) *Attorney, Agent, or Firm* — Sage Patent Group

(57) ABSTRACT

Method for measuring wear of a clutch including
 a casing,
 a first shaft member including a friction disk,
 a second shaft member,
 an interface member mounted on the second shaft member and including a friction disk,
 a biasing member urging the interface member towards the engaged position,
 an actuation device including a contact part moveable between a rest position in which a gap exists between the contact part and the biasing member, and an active position in which the contact part is in contact with the biasing member so as to let the interface member move towards the disengaged position,
the wear measurement method including
 injecting pressurized fluid so as to put the contact part in contact with the biasing member,
 measuring an injection parameter related to the gap,
 determining the gap based on the injection parameter.

20 Claims, 4 Drawing Sheets

(52) U.S. Cl.
CPC ............... *F16D 2500/1045* (2013.01); *F16D 2500/3024* (2013.01); *F16D 2500/5023* (2013.01); *F16D 2500/7041* (2013.01)

METHOD FOR MEASURING WEAR OF A CLUTCH AND RELATED MAINTENANCE METHOD, ASSEMBLY COMPRISING A CLUTCH AND A WEAR MEASUREMENT DEVICE, AND VEHICLE

CROSS REFERENCE TO RELATED APPLICATIONS

This application is a 35 U.S.C. § 371 national stage application of PCT International Application No. PCT/EP2018/070852 filed on Aug. 1, 2018, the disclosure and content of which is incorporated by reference herein in its entirety.

FIELD OF THE DISCLOSURE

The invention relates to a method for measuring wear of a clutch and to a related maintenance method, assembly comprising a pneumatic clutch and a wear measurement device, and vehicle.

BACKGROUND OF THE DISCLOSURE

Although not limited thereto, the invention applies in particular to maintenance of the pneumatic clutch of an air compressor of a pneumatic system of a vehicle.

Vehicles and especially large vehicles, such as trucks or buses, are equipped with a pneumatic system in which one or several pneumatic equipments, including among others a pneumatic braking system, are supplied with compressed air from an air compressor driven by an engine of the vehicle. In order to save fuel, the pneumatic clutch is generally used to disconnect the air compressor from the engine when pressure in the pneumatic system is sufficient and it is no longer necessary to supply compressed air.

During the vehicle life time, the pneumatic clutch is subjected to wear.

Currently, checking of the wear of the pneumatic clutch requires the entire air compressor to be disassembled from the vehicle which generally takes several hours. As a consequence, wear of the pneumatic clutch is only checked in occurrence of a dysfunction in the pneumatic system. Such dysfunction results in a high risk the vehicle is immobilized for a long period and, of most importance, for a period the occurrence of which is unknown.

The same applies to clutches implemented in other systems of a vehicle, such as transmission system, or in other system of a machine.

Hence, there is a need for a method enabling wear of a clutch to be measured in a reliable, simple and rapid manner.

The invention aims at meeting such need.

SUMMARY OF THE DISCLOSURE

To this end, according to a first aspect, the invention provides a method for measuring wear of a clutch, the clutch comprising:
a casing presenting a longitudinal axis,
a first shaft member configured to rotate about the longitudinal axis with respect to the casing, the first shaft member including at least one friction disk extending radially with respect to the longitudinal axis,
a second shaft member configured to rotate about the longitudinal axis with respect to the casing,
an interface member mounted on the second shaft member so as to be moveable in translation along the longitudinal axis while being fixed in rotation with respect to the second shaft member, the interface member including at least one friction disk extending radially with respect to the longitudinal axis so as to face the friction disk of the first shaft member, the interface member being moveable between an engaged position in which the friction disk of said interface member is in contact with the friction disk of the first shaft member, and a disengaged position in which the friction disk of said interface member is spaced apart from the friction disk of the first shaft member,
a biasing member urging the interface member towards the engaged position,
an actuation device comprising a housing, a piston part slidably mounted within the housing and a contact part, the housing and the piston part defining a pressure chamber configured to be reversibly filled with pressurized fluid so as to reciprocate the piston part within the housing, the contact part being linked to the piston part so as to be moveable in translation along the longitudinal axis between:
a rest position in which said contact part is spaced apart from the biasing member when the pressure chamber is empty, a gap existing between the contact part and the biasing member, and
an active position in which the contact part is in contact with the biasing member when the pressure chamber is filled with pressurized fluid, so as to let the interface member move towards the disengaged position,
wherein the method comprises:
from the rest position of the contact part of the actuation device, injecting pressurized fluid within the pressure chamber of the actuation device so as to put the contact part in contact with the biasing member,
while pressurized fluid is injected, measuring at least one injection parameter chosen between a pressure and a volume of pressurized fluid, the injection parameter being related to the gap between the contact part and the biasing member,
determining the gap between the contact part and the biasing member based on the injection parameter, the gap being representative of wear of the friction disks of the interface member and the first shaft member.

Repeated contacts of the friction disks of the interface member and the first shaft member with each other result in a modification of the thickness of the friction disks which in turn results in a modification of the gap between the contact part of the actuation device and the biasing member.

The invention makes use of such modification of the gap between the contact part of the actuation device and the biasing member to quantify wear of the friction disks of the interface member and the first shaft member.

The invention also makes use of actuation of the contact part of the actuation device by injection of pressurized fluid to determine the gap between the contact part of the actuation device and the biasing member.

Hence, the method enables wear of the clutch to be measured in a reliable and simple manner directly on the clutch. The method does not require any disassembling which save time. Wear of the clutch may be checked periodically during maintenance of the vehicle so as to anticipate possible dysfunction. Where needed, the method could be used to monitor continuously wear of the clutch.

In an embodiment, pressurized fluid may be injected until an input pressure is reached, the input pressure being representative of a contact situation where the contact part of the actuation device is in contact with the biasing member, and the volume of pressurized fluid injected in the pressure chamber of the actuation device may be measured as the injection parameter until the input pressure is reached.

The input pressure may be greater than or equal to a maximum pressure on a full range of wear to have the contact part of the actuation device and the biasing member in contact, and lower than or equal to a minimum pressure on the full range of wear to have the interface member in the disengaged position.

In an alternative embodiment, an input volume of pressurized fluid may be injected, the input volume being representative of a contact situation where the contact part of the actuation device is in contact with the biasing member, and the pressure of pressurized fluid injected in the pressure chamber of the actuation device that is reached after the input volume has been injected may be measured as the injection parameter.

The input volume may be greater than or equal to a maximum volume on a full range of wear to have the contact part of the actuation device and the biasing member in contact, and lower than or equal to a minimum volume on the full range of wear to have the interface member in the disengaged position.

Before injecting pressurized fluid within the pressure chamber of the actuation device, it may be checked that the contact part of the actuation device is in the rest position.

In particular, before injecting pressurized fluid within the pressure chamber of the actuation device, vacuum may be applied to the pressure chamber of the actuation device.

Such provision ensures the rest position is the same whenever measurement of the wear of the clutch is performed.

The clutch may be the pneumatic clutch of an air compressor of a pneumatic system of a vehicle, the first shaft member being linked to an engine of the vehicle and the second shaft member being mounted on the shaft of the air compressor, the air compressor supplying at least one pneumatic equipment of the pneumatic system of the vehicle with compressed air as the shaft rotates.

The air compressor may comprise a conduit removably connected to the housing of the actuation device for supplying the pressure chamber with compressed air from an outlet port of the air compressor, and the method may comprise, before injecting compressed air within the pressure chamber of the actuation device, disconnecting the conduit from the housing and connecting a source of compressed air to the housing.

According to a second aspect, the invention proposes a maintenance method of a system including a clutch, the maintenance method comprising:
implementing the method as defined previously,
replacing the clutch if a critical gap between the contact part of the actuation device and the biasing member representative of a critical wear of the friction disks of the interface member and the first shaft member is determined.

According to a third aspect, the invention proposes an assembly comprising a clutch and a wear measurement device for measuring wear of the clutch,
wherein the clutch comprises:
a casing presenting a longitudinal axis,
a first shaft member configured to rotate about the longitudinal axis with respect to the casing, the first shaft member including at least one friction disk extending radially with respect to the longitudinal axis,
a second shaft member configured to rotate about the longitudinal axis with respect to the casing,
an interface member mounted on the second shaft member so as to be moveable in translation along the longitudinal axis while being fixed in rotation with respect to the second shaft member, the interface member including at least one friction disk extending radially with respect to the longitudinal axis so as to face the friction disk of the first shaft member, the interface member being moveable between an engaged position in which the friction disk of said interface member is in contact with the friction disk of the first shaft member, and a disengaged position in which the friction disk of said interface member is spaced apart from the friction disk of the first shaft member,
a biasing member urging the interface member towards the engaged position,
an actuation device comprising a housing, a piston part slidably mounted within the housing and a contact part, the housing and the piston part defining a pressure chamber configured to be reversibly filled with pressurized fluid so as to reciprocate the piston part within the housing, the contact part being linked to the piston part so as to be moveable in translation along the longitudinal axis between:
a rest position in which said contact part is spaced apart from the biasing member when the pressure chamber is empty, a gap existing between the contact part and the biasing member, and
an active position in which the contact part is in contact with the biasing member when the pressure chamber is filled with pressurized fluid, so as to let the interface member move towards the disengaged position, and
wherein the wear measurement device comprises:
a source of pressurized fluid configured to inject pressurized fluid within the pressure chamber so as to put the contact part of the actuation device in contact with the biasing member,
a sensor arrangement configured to measure at least one injection parameter chosen between a pressure and a volume of pressurized fluid while pressurized fluid is injected, the injection parameter being related to the gap between the contact part of the actuation device and the biasing member,
a control member suitable for determining the gap between the contact part of the actuation device and the biasing member based on the injection parameter, the gap being representative of wear of the friction disks of the interface member and the first shaft member.

In an embodiment, the sensor arrangement may be configured to measure the volume of pressurized fluid injected in the pressure chamber of the actuation device as the injection parameter until an input pressure of pressurized fluid is reached, the input pressure being representative of a contact situation where the contact part of the actuation device is in contact with the biasing member, and the control member of the wear measurement device may be configured to associate a value of the volume of pressurized fluid to a value for the gap between the contact part of the actuation device and the biasing member.

The input pressure may be greater than or equal to a maximum pressure on a full range of wear to have the contact part of the actuation device and the biasing member in contact, and lower than or equal to a minimum pressure on the full range of wear to have the interface member in the disengaged position.

In an alternative embodiment, the sensor arrangement may be configured to measure the pressure of pressurized fluid injected in the pressure chamber of the actuation device that is reached after an input volume of pressurized fluid has been injected as the injection parameter, the input volume being representative of a contact situation where the contact part of the actuation device is in contact with the biasing member, and the control member of the wear measurement device may be configured to associate a value of the pressure of pressurized fluid to a value for the gap between the contact part of the actuation device and the biasing member.

The input volume may be greater than or equal to a maximum volume on a full range of wear to have the contact part of the actuation device and the biasing member in contact, and lower than or equal to a minimum volume on the full range of wear to have the interface member in the disengaged position.

The wear measurement device may be configured to check that the contact part of the actuation device is in the rest position before injecting pressurized fluid within the pressure chamber.

The wear measurement device may further comprise a pumping member configured to apply vacuum to the pressure chamber before injecting pressurized fluid within the pressure chamber.

The casing may include:
a wall around the longitudinal axis, the wall presenting an inner contact surface cylindrical along the longitudinal axis, the wall forming the housing of the actuation device and the piston part of the actuation device being slidably mounted on the inner contact surface,
an access port arranged in the casing and opening into the pressure chamber of the actuation device, the access port being configured to enable the pressure chamber to be filled with pressurized fluid so as to place the contact part of the actuation device in the active position and to be emptied so as to place the contact part of the actuation device in the rest position.

The clutch may be a pneumatic clutch, the pressurized fluid being compressed air.

The assembly may further comprise an air compressor of a pneumatic system of a vehicle, and the clutch may be the pneumatic clutch of the air compressor, the first shaft member being configured to be linked to an engine of the vehicle and the second shaft member being mounted on the shaft of the air compressor, the air compressor supplying at least one pneumatic equipment of the pneumatic system of the vehicle with compressed air as the shaft rotates.

The air compressor may comprise a conduit removably connected to the housing of the actuation device for supplying the pressure chamber with compressed air from an outlet port of the air compressor.

According to a fourth aspect, the invention proposes a vehicle comprising an assembly as defined previously.

BRIEF DESCRIPTION OF THE DRAWINGS

Other objects and advantages of the invention will emerge from the following disclosure of a particular embodiment of the invention given as non limitative example, the disclosure being made in reference to the enclosed drawings in which.

DETAILED DESCRIPTION

On the Figures, the same reference numbers refer to the same or similar elements.

Figure 1:
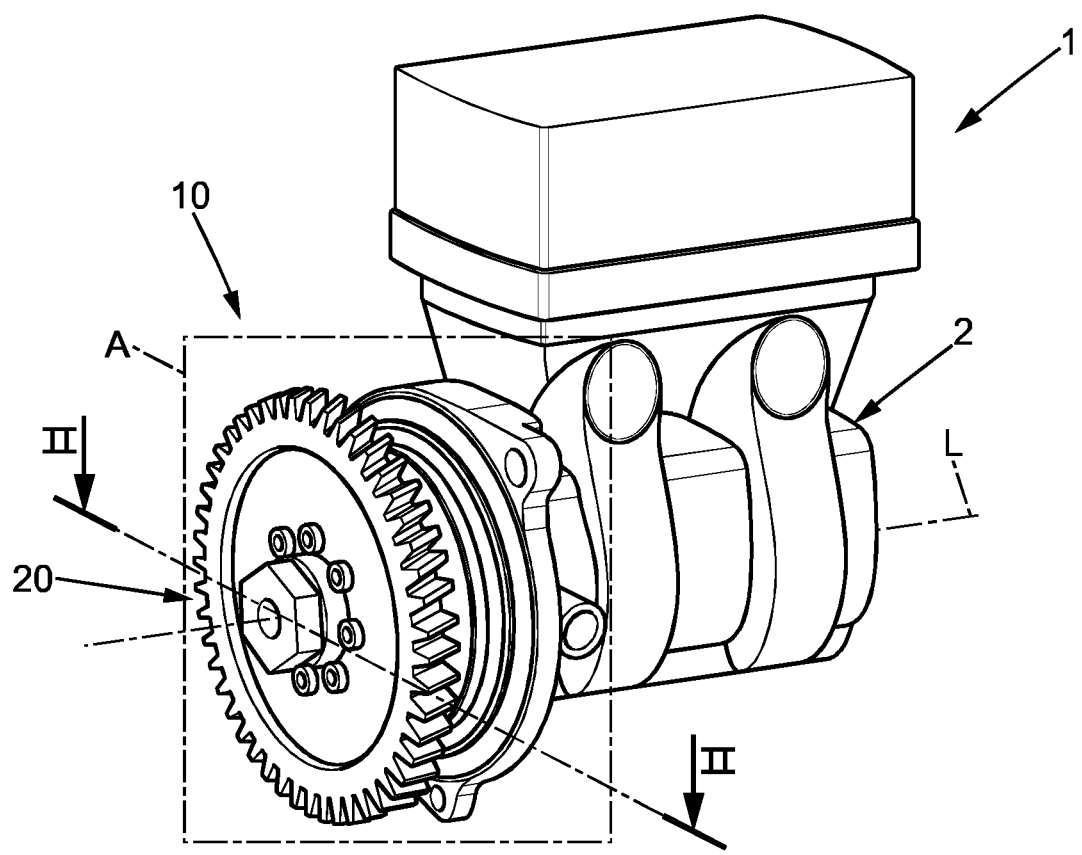
FIG. 1 is a view of an air compressor of a pneumatic system of a vehicle intended to supply pneumatic equipments of the vehicle with compressed air, the air compressor is linked to an engine of the vehicle through a pneumatic clutch.

FIG. 1 shows an assembly of a system including a clutch according to an embodiment of the invention.

In the represented embodiment, although not limited thereto, the assembly is part of a pneumatic system of a vehicle, especially a large vehicle such as a truck or a bus, comprising one or several pneumatic equipments, such as a pneumatic braking system, operating with compressed air.

Figure 2:
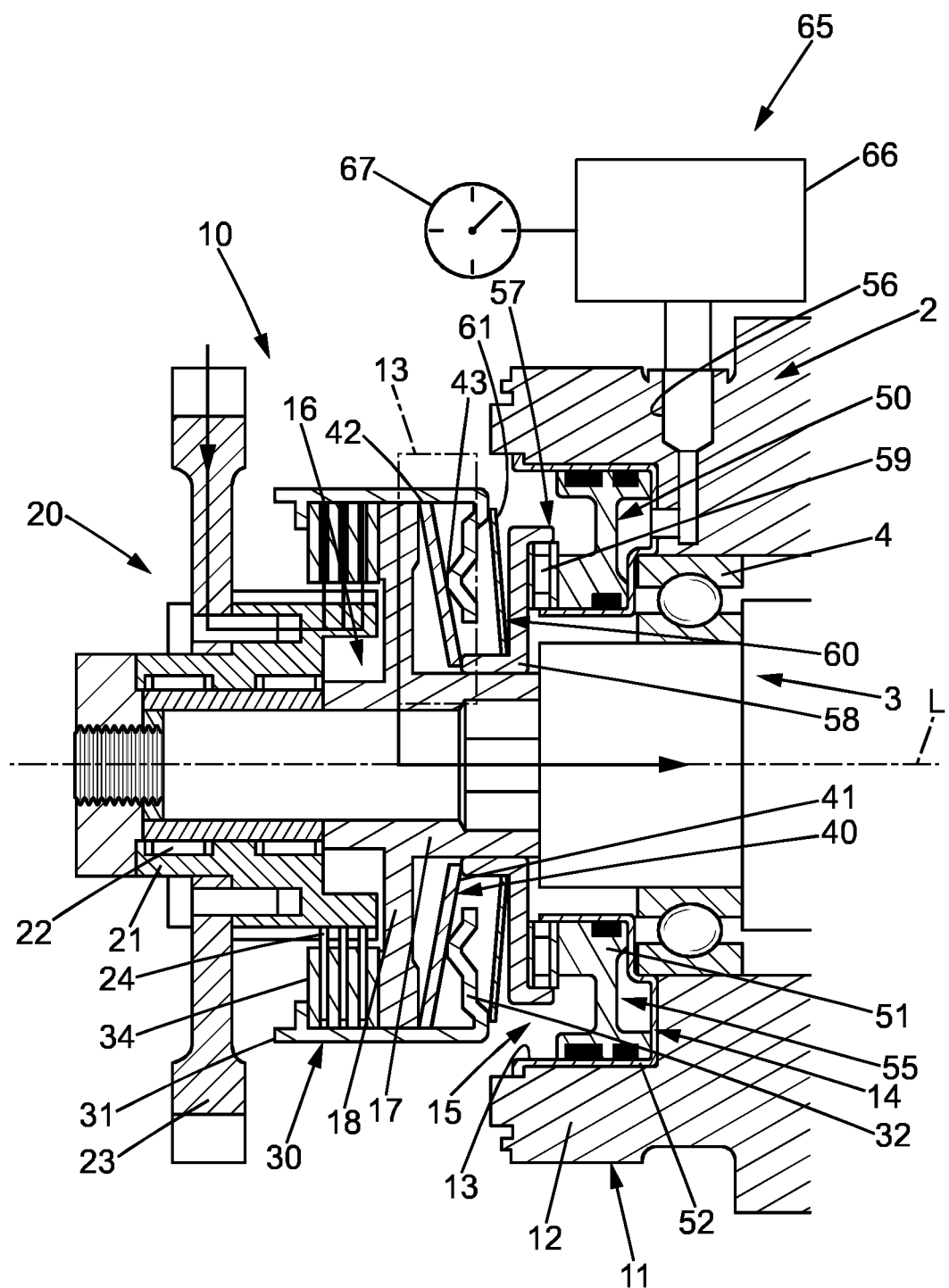
FIG. 2 is a partial view in section along line II-II of detail referenced A on FIG. 1 of the pneumatic clutch of FIG. 1 to which a wear measurement device is connected, the pneumatic clutch having an interface member movably mounted on a second shaft member and urged towards an engaged position by a biasing member so that the second shaft member is caused to rotate by a first shaft member linked to the engine of the vehicle, the pneumatic clutch further having an actuation device which, upon actuation by injection of compressed air as pressurized fluid, acts on the biasing member to move the interface member towards a disengaged position to stop the second shaft member from being driven.

On FIGS. 1 and 2, the assembly comprises an air compressor 1 intended to supply the pneumatic equipments of the pneumatic system with compressed air. The air compressor 1 comprises:
a casing 2 presenting a longitudinal axis L,
a shaft 3 extending along the longitudinal axis L and rotatably mounted about the longitudinal axis L, for example through ball bearings 4, and
a transmission mechanism, not shown, configured to produce compressed air as the shaft 3 rotates about the longitudinal axis L.

The shaft 3 is caused to rotate thanks to an engine of the vehicle further driving wheels or other contact members with which the vehicle may move on a ground surface. To that end, the air compressor 1 may be connected to the engine of the vehicle. Nevertheless, in order to save fuel, it should be possible to disconnect the air compressor 1 from the engine when pressure in the pneumatic system is sufficient and it is no longer necessary to supply compressed air. To that end, the air compressor 1 includes a clutch 10 though which it is connected to the engine.

The clutch 10 comprises a first shaft member 20 configured to rotate about the longitudinal axis L with respect to the casing 2. More specifically, the first shaft member 20 comprises a hub 21 tubular along the longitudinal axis L and rotatably mounted on a portion of the shaft 3 of the air compressor 1 protruding from the casing 2, for example through roller bearings 22. From an end of the hub 21 opposite the air compressor 1, a gear 23 extends radially with respect to the longitudinal axis L, and extends away from the longitudinal axis L. The gear 23 is configured to be linked, through a transmission arrangement not shown, to the engine of the vehicle. The first shaft member 20 is hence driven in rotation as the engine of the vehicle rotates. At an end of the hub 21 opposite the gear 23 and then close to the air compressor 1, one or several friction disks 24, three on FIG. 2, extend radially with respect to the longitudinal axis L, away from the longitudinal axis L.

The clutch 10 also comprises a second shaft member 16 including an annular hub 17 fitted on the shaft 3 of the air compressor 1. A flange 18 extends radially from the hub 17 of the second shaft member 16 and extends away from the longitudinal axis L.

The clutch 10 comprises an interface member 30 having an annular portion 31 extending axially with respect to the longitudinal axis L between opposite ends, and a transverse portion 32 extending radially with respect to the longitudinal axis L, towards the longitudinal axis L at one of the ends of the annular portion 31. On an inner surface, directed towards the longitudinal axis L, the annular portion 31 is provided with one or several, four on FIG. 2, friction disks 34 extending radially with respect to the longitudinal axis L, towards the longitudinal axis L. The annular portion 31 of the interface member 30 is mounted on the flange 18 of the second shaft member 16 in any appropriate manner, for example through flutes cooperating with corresponding flutes on the flange 18 of the second shaft member 16, so as to be moveable in translation along the longitudinal axis L while being fixed in rotation with respect to the second shaft member 16, the transverse portion 32 being directed towards the air compressor 1 and the friction disks 34 of the interface member 30 facing the friction disks 24 of the first shaft member 20.

A biasing member 40, in the form of an annular cup spring 41, is provided to urge the interface member 30 towards an engaged position in which its friction disks 34 are in contact with the friction disks 24 of the first shaft member 20. In such engaged position, rotation of the first shaft member 20 imparted by the engine of the vehicle is transmitted to the second shaft member 16 through the friction disks 24, 34 and the interface member 30. More particularly, the cup spring 41 has an inclined wall from an outer circular base 42 to an inner circular summit 43. The summit 43 is fitted on the hub 17 of the second shaft member 16 at a distance from the flange 18, and the base 42 rests against the flange 18. A portion of the cup spring 41 between the base 42 and the summit 43 rests against an annular protrusion 35 formed on the transverse portion 32 of the interface member 30 so as to space apart the transverse portion 32 of the interface member 30 from the flange 18 and to put the frictions disks 34 of the interface member 30 in contact with the friction disks 24 of the first shaft member 20.

In the represented embodiment, the first shaft member 20 is configured to be linked to the engine while the second shaft member 16 is configured to be driven a rotation by the first shaft member 20 through the interface member 30 and the biasing member 40. The first shaft member 20 acts as a driving shaft while the second shaft member 16 acts as a driven shaft. The invention is however not limited to such arrangement. In another embodiment, the second shaft member 16 could act as a driving shaft while the first shaft member 20 could act as a driven shaft thanks to appropriate configuration and arrangement of the first 20 and second 16 shaft members as well as of the interface member 30 and the biasing member 40.

In order to enable the interface member 30 to be moved to a disengaged position in which its friction disks 34 are spaced apart from the friction disks 24 of the first shaft member 16 to thereby disconnect the first shaft member 16 from the second shaft member 20, the clutch 10 comprises an actuation device 50.

The actuation device 50 comprises a housing 11, a piston part 51 slidably mounted within the housing 11 and a contact part 57. The housing 11 and the piston part 51 define a pressure chamber 55 configured to be reversibly filled with a pressurized fluid so as to reciprocate the piston part 51 within the housing 11. The contact part 57 is linked to the piston part 51 so as to be moveable in translation along the longitudinal axis L.

In the represented embodiment, the actuation device 50 partly integrated in the casing 2 of the air compressor 1.

More specifically, the casing 2 includes a wall 12 that is annular around the longitudinal axis L. The wall has an inner contact surface 13 cylindrical along the longitudinal axis L and provided with a ring 14 around the longitudinal axis L. The ring 14 has a generally U-shaped groove 15 opened opposite the air conditioner 1. The wall 12 forms the housing 11 of the actuation device 50.

The piston part 51 of the actuation device 50 is slidably mounted on the inner contact surface 13 of the wall 12 so as to be moveable in translation along the longitudinal axis L. Advantageously, the piston part 51 is provided with sealing joints 52 and arranged within the groove 15 of the ring 14 of the casing 2. The piston part 51 and the inner contact surface 13 of the wall 12 define the pressure chamber 55. An access port 56 is arranged in the casing 2 and opens into the pressure chamber 55.

In the represented embodiment, the contact part 57 is advantageously directly fitted on the second shaft member 16 and directly linked to the piston part 51. In particular, the contact part 57 has an annular skirt 58 fitted on the hub 17 of the second shaft member 16. To enable the contact part 57 to rotate along with the second shaft member 16 with respect to the piston part 51 while enabling a translation of the piston part 51 to be transmitted to the contact part 57, a roller bearing 59 is provided between piston 51 and contact 57 parts.

Although disclosed in relation with an actuation device 50 partly integrated within the casing 2 of the air compressor 1, the invention is not limited thereto. In other embodiments, the actuation device could be any otherwise configured. For example, the actuation device could be separate from the casing 2 of the air compressor 1. The actuation device 50 could then have a housing apart from the casing 2 of the air compressor 1, in which the piston part may reciprocate. The contact part could be linked to the piston part in any appropriate manner, form example through one or several articulated links, to be movable along the longitudinal direction L.

Figure 3:
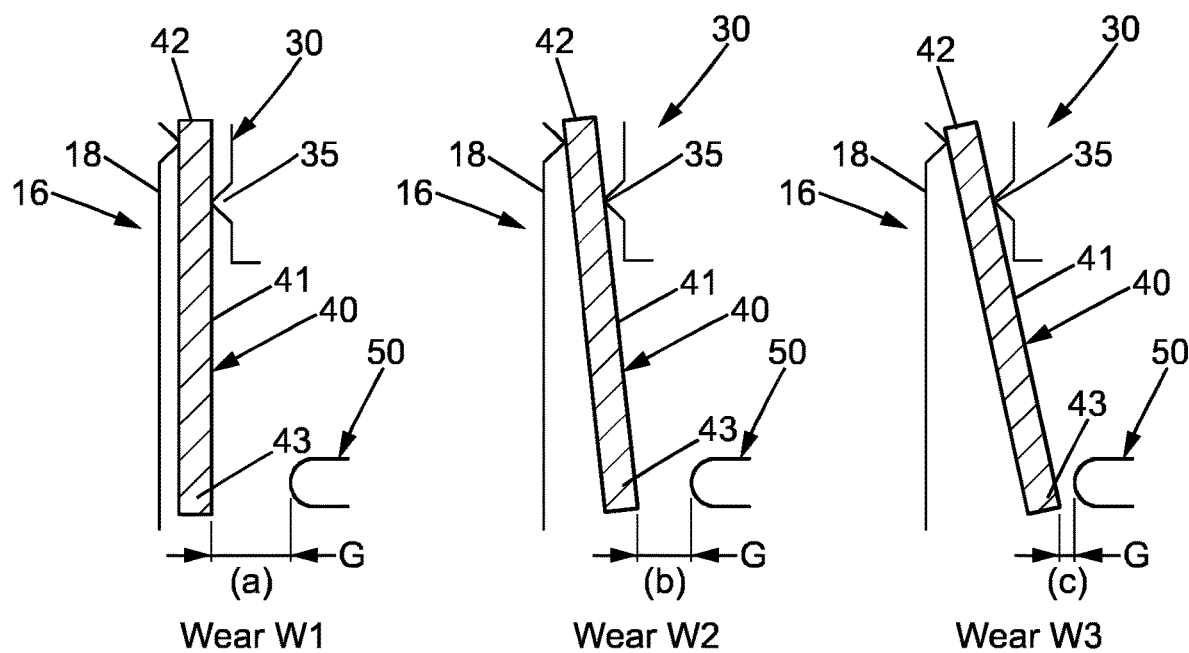
FIG. 3 is an enlarged view of the detail referenced B on FIG. 2 illustrating a contact part of the actuation device in a rest position in which it is spaced apart from the biasing member so as to let the biasing member urging the interface member towards the engaged position, FIG. 3 also illustrates a gap between the contact part of the actuation device and the biasing member when wear of the pneumatic clutch has (a) a value W1 corresponding to situations where no or almost no wear has occurred, (b) a value W2 corresponding to situations where wear is intermediate and (c) a value W3 corresponding to situations where wear is maximum.

On FIG. 3, as the pressure chamber 55 is empty, the contact part 57 is in a rest position in which a free end of the skirt 58 is spaced apart from the summit 43 of the cup spring 41. In this position, the cup spring 41 freely exerts a biasing force to urge the interface member 30 towards the engaged position thanks to the contacts with the flange 18 of the first shaft member 16 and the protrusion 35 of the transverse portion 32 of the interface member 30 as explained above.

A return member 60 is provided to urge the contact part of the actuation device towards the rest position. In the represented embodiment, the return member 60 is in the form of an annular cup spring 61 having an inclined wall from an outer circular base to an inner circular summit. The summit is fitted on the skirt 58 of the contact part 57 and the base rests the transverse portion 32 of the interface member 30. The return member 60 exerts a biasing force in a direction opposite that of the cup spring 41 of the biasing member 40. The biasing force of the return member 60 has then a lower amplitude than that of the biasing member 40 to avoid the return member 60 to counteract against the biasing member 40 and ensure the interface member 30 remains in the engaged portion under the effect of the biasing member 40 when both biasing 40 and return 60 members acts on the interface member 30.

In the rest position, a gap G exists between the free end of the skirt 58 of the contact part 57 and the summit 43 of the cup spring 41. During the vehicle life time, wear of the friction disks 24, 34 results in a modification of the gap G. The gap G is hence directly representative of wear W of the clutch 10. More particularly, FIG. 3 illustrates the gap G when wear W of the clutch 10 has (a) a value W1 corresponding to a situation where no or almost no wear has occurred, (b) a value W2 corresponding to a situation where wear W is intermediate and (c) a value W3 corresponding to a situation where wear W is maximum.

In the represented embodiment, the gap G decreases as wear W increases. As a purely illustrative and non-limiting example, a design of the clutch 10 may be such that:
  when no wear W as occurred, the value W1 equals to 0 mm, the gap G measures 5 mm,
  when the wear W is intermediate, and especially medium, the value W2 equals to 0.6 mm, the gap G measures 3 mm, the summit 43 of the cup spring 41 having been displaced of 2 mm,
  when the wear W is maximum, the value W3 equals to 1.2 mm, the gap G measures 1 mm, the summit 43 of the cup spring 41 having been displaced of 4 mm.

It derives from the above that according to the particular design, a relation between the wear W and a displacement D of the summit 43 of the cup spring 41 is $W=D/3.33$ and hence, a relation between the wear W and the gap G is $W=(G0-G)/3.33$ where G0 in the initial gap when no wear has occurred.

Depending on the design, wear W of the clutch 10 can be determined based on the gap G through the relation $W=(G0-G)/k$ where k calculated based on a ratio of a total height of the biasing member 40, measured along the longitudinal direction L, and a height from the base 42 of the biasing member 40 to the protrusion 35 of the transverse portion 32 of the interface member 30. Alternatively, the coefficient k may be determined empirically on a test bench.

Figure 4:
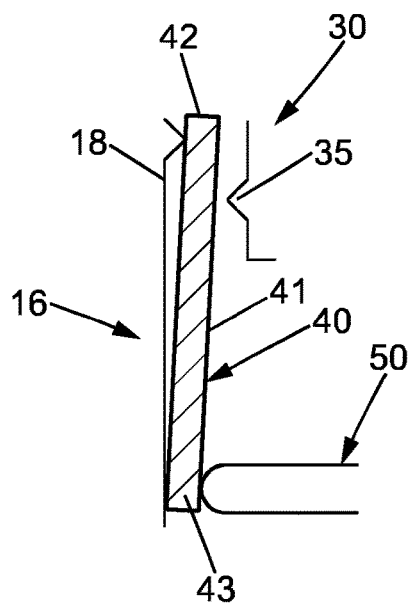
FIG. 4 is an enlarged view of the detail referenced B on FIG. 2 illustrating the contact part of the actuation device in an active position in which it is in contact with the biasing member so as to let the interface member move towards the disengaged position.

As apparent from the above and as illustrated on FIG. 4, injection of pressurized fluid within the pressure chamber 55 through the access port 56 may cause the contact part 57 of the actuation device 50 to move towards an active position in which it is in contact with the summit 43 of the cup spring 41 to remove the contact of the cup spring 41 with the protrusion 35 of the transverse portion 32 of the interface member 30. The biasing force of the cup spring 41 no longer exerts on the interface member 30 which may move towards the disengaged position under the effect of the return member 60. In the disengaged position of the interface member 30, its friction disks 34 are spaced apart from the friction disks 24 of the first shaft member 16 thereby releasing the second shaft member 16 from the first shaft member 20.

In the represented embodiment, the clutch 10 is preferably a pneumatic clutch in which the pressurized fluid is compressed air. To ensure disconnection of the air compressor 1 from the engine when pressure in the pneumatic system is sufficient, a conduit may be removably connected to the access port 56 for supplying the pressure chamber 55 of the clutch 10 with compressed air from an outlet port of the air compressor 1.

In order to measure wear of the clutch 10, for example during maintenance of the vehicle, a wear measurement device 65 is provided.

The wear measurement device 65 comprises a source of pressurized fluid 66, and especially of compressed air, configured to be connected in a removable manner to the access port 56 and to inject pressurized fluid within the pressure chamber 55. The wear measurement device 65 may also comprise a pumping member. The pumping member may be the same device as the source of pressurized fluid 66 but operated in an inverted manner or a separate device.

The wear measurement device 65 also comprises:
  a sensor arrangement 67 configured to measure at least one injection parameter chosen between a pressure and a volume of pressurized fluid while pressurized fluid is injected, and
  a control member suitable for determining the gap between the contact part 57 of the actuation device 50 and the biasing member 40 based on the injection parameter.

The injection parameter is related to the gap G between the contact part 57 of the actuation device 50 and the biasing member 40. Such relation may be established empirically, once on a test bench, for each design of clutch 10. Experiments can then be carried out to associate each value of the injection parameter to a value of the gap G. Results of these experiments can be stored in the form of a table, a curve, a transfer function and similar on a sheet or an electronic memory of a control unit, which sheet or electronic memory of a control unit will serve as control member.

Figure 5:
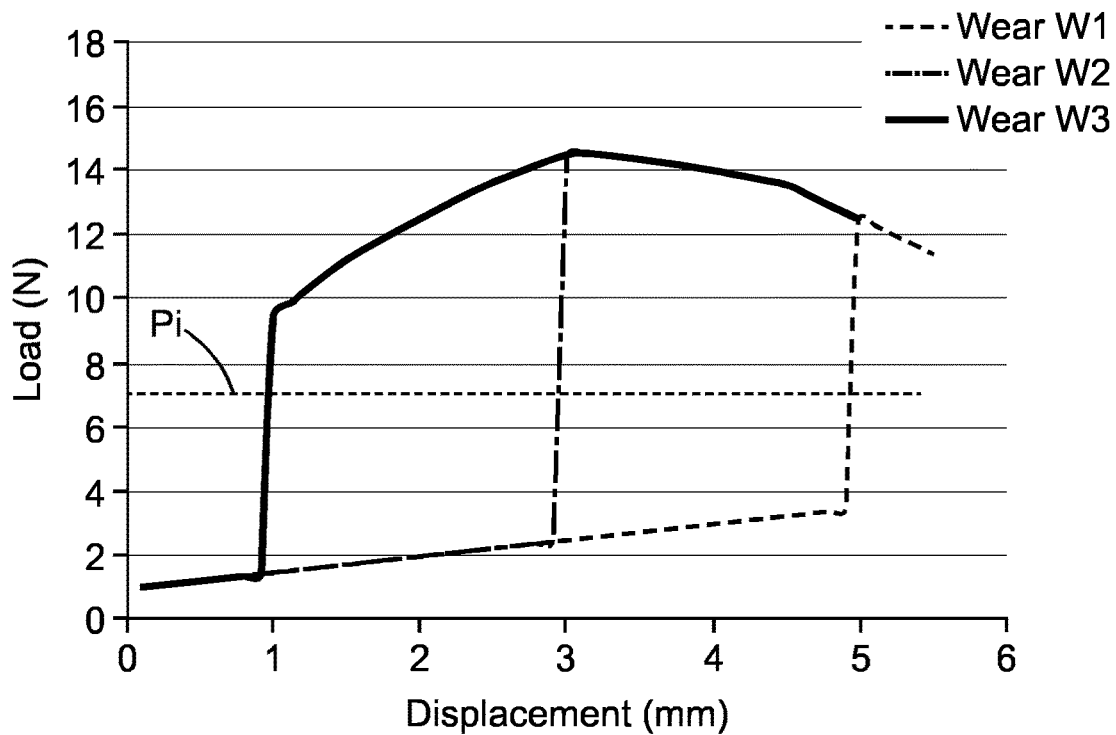
FIG. 5 is a graph illustrating evolution of load of the contact part of the actuation device on the biasing member as a function of displacement of the contact part for the different values W1, W2, W3 of wear in an embodiment in which the gap is measured based on a volume of compressed air injected until an input pressure of compressed air is reached as the injection parameter.
Figure 6:
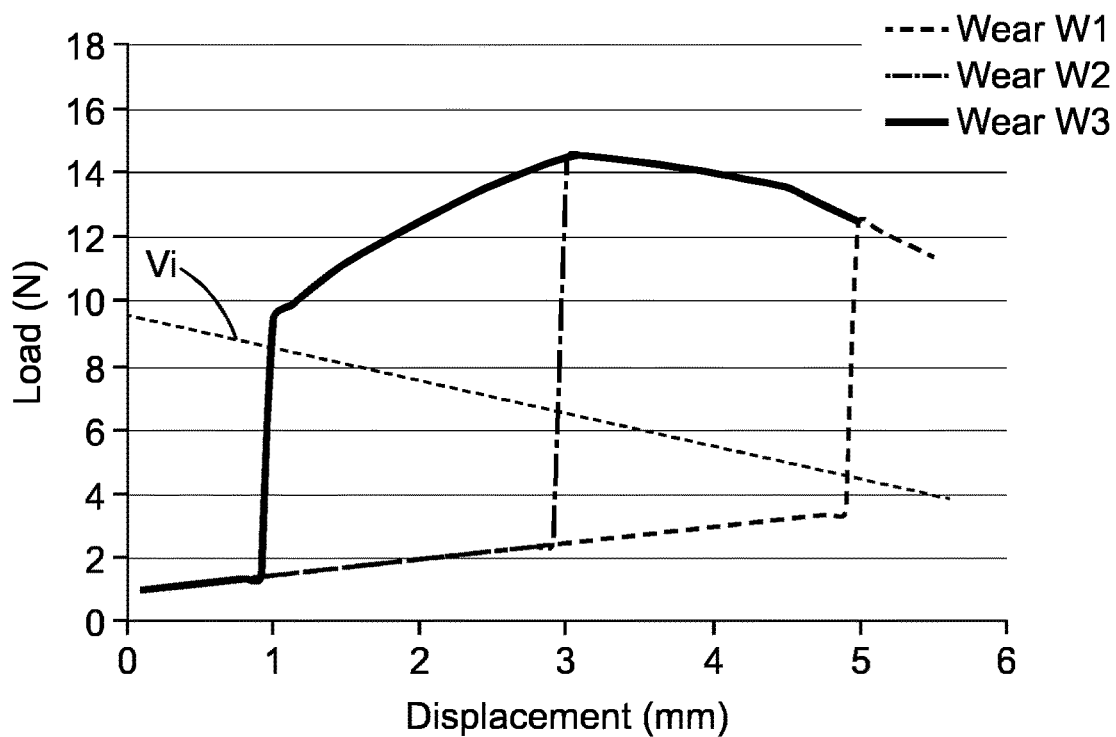
FIG. 6 is a graph illustrating evolution of load of the contact part of the actuation device on the biasing member as a function of displacement of the contact part for the different values W1, W2, W3 of wear in an embodiment in which the gap is measured based on a pressure of compressed that is reached after an input volume of compressed air has been injected as the injection parameter.

A method for measuring wear of the clutch 10 implementing the wear measurement device is now disclosed in relation to FIGS. 5 and 6.

Initially, the conduit between the access port 56 and the outlet of the air compressor 1 is disconnected and the pumping member of the wear measurement device 65 is connected to the access port 56 to apply vacuum to the chamber 56. In doing so, the pressure chamber 55 is emptied and the contact part 57 of the actuation device 50 is positioned in the rest position.

The pumping member is then removed and the source of pressurized fluid 66 is connected to the access port 56. Alternatively, the device operating either as pumping member or source of pressurized fluid 66 is operated in the inverted manner. The pressure chamber 55 is then filled with pressurized fluid so as to put the contact part 57 of the actuation device 50 in contact with the cup spring 41 of the biasing member 40 as it is moved towards the active position.

While pressurized fluid is injected, the injection parameter is measured and the gap G between the contact part 57 of the actuation device 50 and the cup spring 41 of the biasing member 40 is determined based on the injection parameter.

In an embodiment shown on FIG. 5, the sensor arrangement 67 is configured to measure the volume of pressurized fluid injected in the pressure chamber 55 of the actuation device 50 as the injection parameter until an input pressure Pi of pressurized fluid is reached. The input pressure Pi is chosen to be representative of a contact situation where the contact part 57 of the actuation device 50 is in contact with the biasing member 40. In particular, the input pressure Pi may be greater than or equal to a maximum pressure on a full range of wear to have the contact part 57 of the actuation device 50 and the biasing member 40 in contact, and lower than or equal to a minimum pressure on the full range of wear to have the interface member 30 in the disengaged position. The full range of wear gathers wears from new friction disks 34 of the interface member 30 and of the first shaft member 20 having no wear to with friction disks 34 of the interface member 30 and the first shaft member 20 to be replaced having a maximum wear.

As illustrated on FIG. 5, the above provisions as regards input pressure Pi ensure, that whichever the wear is, namely W1, W2 or W3, as the input pressure is reached, load of the contact part 57 of the actuation device 50 as a function of the displacement of the contact part 57 is a raising portion representative of the situation where the contact part 57 is acting on the biasing member 40.

Depending on the value of the volume of pressurized fluid injected within the pressure chamber 55 before the input pressure Pi is reached, the value of the gap G between the contact part 57 of the actuation device 50 and the biasing member 40 and, in turn, wear W of the clutch 10 can be determined thanks to the control member of the wear measurement device 65.

In an alternative embodiment on FIG. 6, the sensor arrangement 67 is configured to measure the pressure of pressurized fluid injected in the pressure chamber 55 of the actuation device 50 that is reached after an input volume Vi of pressurized fluid has been injected as the injection parameter. The input volume Vi is chosen to be representative of a contact situation where the contact part 57 of the actuation device 50 is in contact with the biasing member 40. In particular, the input volume Vi is greater than or equal to a maximum volume on a full range of wear to have the contact part 57 of the actuation device 50 and the biasing member 40 in contact, and lower than or equal to a minimum volume on the full range of wear to have the interface member 30 in the disengaged position.

Here again, as illustrated on FIG. 6, the above provisions as regards input volume Vi ensure, that whichever the wear is, namely W1, W2 or W3, the input volume Vi is injected to ensure that load of the contact part 57 of the actuation device 50 as a function of the displacement of the contact part 57 is the raising portion representative of the situation where the contact part 57 is acting on the biasing member 40.

Depending on the value of the pressure of pressurized fluid within the pressure chamber 55 after the input volume has been injected, the value for the gap G between the contact part 57 of the actuation device 50 and the biasing member 40 and, in turn, wear W of the clutch 10 can be determined thanks to the control member of the wear measurement device 65.

Such method finds advantageous application in maintenance of the vehicle and, more particularly, of the pneumatic system of the vehicle since it enables the clutch 10 to be replaced if a critical gap between the actuator 50 and the biasing member 40 representative of a critical wear of the friction disks 24, 34 of the interface member 30 and the first shaft member 20 is determined.

The invention has been disclosed in relation with a pneumatic clutch 10 of an air compressor of a pneumatic system 1. The invention applies to any system implementing a clutch operating with any other pressurized fluid to selectively couple and decouple first and second shaft members.

The invention claimed is:

1. A method for measuring wear of a clutch, the clutch comprising:
   a casing presenting a longitudinal axis,
   a first shaft member configured to rotate about the longitudinal axis with respect to the casing, the first shaft member including at least one friction disk extending radially with respect to the longitudinal axis,
   a second shaft member configured to rotate about the longitudinal axis with respect to the casing,
   an interface member mounted on the second shaft member so as to be moveable in translation along the longitudinal axis while being fixed in rotation with respect to the second shaft member, the interface member including at least one friction disk extending radially with respect to the longitudinal axis so as to face the friction disk of the first shaft member, the interface member being moveable between an engaged position in which the friction disk of said interface member is in contact with the friction disk of the first shaft member, and a disengaged position in which the friction disk of said interface member is spaced apart from the friction disk of the first shaft member,
   a biasing member urging the interface member towards the engaged position,
   an actuation device comprising a housing, a piston part slidably mounted within the housing and a contact part, the housing and the piston part defining a pressure chamber configured to be reversibly filled with pressurized fluid so as to reciprocate the piston part within the housing, the contact part being linked to the piston part so as to be moveable in translation along the longitudinal axis between:
   a rest position in which said contact part is spaced apart from the biasing member when the pressure chamber is empty, a gap existing between the contact part and the biasing member, and
   an active position in which the contact part is in contact with the biasing member when the pressure chamber is filled with pressurized fluid, so as to let the interface member move towards the disengaged position,
   wherein the method comprises:
   from the rest position of the contact part of the actuation device, injecting pressurized fluid within the pressure chamber of the actuation device so as to put the contact part in contact with the biasing member,
   while pressurized fluid is injected, measuring at least one injection parameter chosen between a pressure and a volume of pressurized fluid, the injection parameter being related to the gap between the contact part and the biasing member,
   determining the gap between the contact part and the biasing member based on the injection parameter, the gap being representative of wear of the friction disks of the interface member and the first shaft member.

2. The method according to claim 1, wherein pressurized fluid is injected until an input pressure is reached, the input pressure being representative of a contact situation where the contact part of the actuation device is in contact with the biasing member, and wherein the volume of pressurized fluid injected in the pressure chamber of the actuation device is measured as the injection parameter until the input pressure is reached.

3. The method according to claim 2, wherein the input pressure is greater than or equal to a maximum pressure on a full range of wear to have the contact part of the actuation device and the biasing member in contact, and lower than or equal to a minimum pressure on the full range of wear to have the interface member in the disengaged position.

4. The method according to claim 1, wherein an input volume of pressurized fluid is injected, the input volume being representative of a contact situation where the contact part of the actuation device is in contact with the biasing member, and wherein the pressure of pressurized fluid injected in the pressure chamber of the actuation device that is reached after the input volume has been injected is measured as the injection parameter.

5. The method according to claim 4, wherein the input volume is greater than or equal to a maximum volume on a full range of wear to have the contact part of the actuation device and the biasing member in contact, and lower than or equal to a minimum volume on the full range of wear to have the interface member in the disengaged position.

6. The method according to claim 1, further comprising, before injecting pressurized fluid within the pressure chamber of the actuation device, checking that the contact part of the actuation device is in the rest position.

7. The method according to claim 6, wherein, before injecting pressurized fluid within the pressure chamber of the actuation device, vacuum is applied to the pressure chamber of the actuation device.

8. The method according to claim 1, wherein the casing includes:

a wall around the longitudinal axis, the wall presenting an inner contact surface cylindrical along the longitudinal axis, the wall forming the housing of the actuation device and the piston part of the actuation device being slidably mounted on the inner contact surface, an access port arranged in the casing and opening into the pressure chamber of the actuation device, the access port being configured to enable the pressure chamber to be filled with pressurized fluid so as to place the contact part of the actuation device in the active position and to be emptied so as to place the contact part of the actuation device in the rest position.

9. The method according to claim 1, wherein the clutch is a pneumatic clutch, the pressurized fluid being compressed air.

10. The method according to claim 9, wherein the clutch is the pneumatic clutch of an air compressor of a pneumatic system of a vehicle, the first shaft member being linked to an engine of the vehicle and the second shaft member being mounted on the shaft of the air compressor, the air compressor supplying at least one pneumatic equipment of the pneumatic system of the vehicle with compressed air as the shaft rotates.

11. The method according to claim 9, wherein the air compressor comprises a conduit removably connected to the housing of the actuation device for supplying the pressure chamber with compressed air from an outlet port of the air compressor, and wherein the method comprises, before injecting compressed air within the pressure chamber of the actuation device, disconnecting the conduit from the housing and connecting a source of compressed air to the housing.

12. A maintenance method of a system including a clutch, the maintenance method comprising:

implementing the method according to claim 1, replacing the clutch if a critical gap between the contact part of the actuation device and the biasing member representative of a critical wear of the friction disks of the interface member and the first shaft member is determined.

13. An assembly comprising a clutch and a wear measurement device for measuring wear of the clutch, wherein the clutch comprises:

a casing presenting a longitudinal axis, a first shaft member configured to rotate about the longitudinal axis with respect to the casing, the first shaft member including at least one friction disk extending radially with respect to the longitudinal axis, a second shaft member configured to rotate about the longitudinal axis with respect to the casing, an interface member mounted on the second shaft member so as to be moveable in translation along the longitudinal axis while being fixed in rotation with respect to the second shaft member, the interface member including at least one friction disk extending radially with respect to the longitudinal axis so as to face the friction disk of the first shaft member, the interface member being moveable between an engaged position in which the friction disk of said interface member is in contact with the friction disk of the first shaft member, and a disengaged position in which the friction disk of said interface member is spaced apart from the friction disk of the first shaft member, a biasing member urging the interface member towards the engaged position, an actuation device comprising a housing, a piston part slidably mounted within the housing and a contact part, the housing and the piston part defining a pressure chamber configured to be reversibly filled with pressurized fluid so as to reciprocate the piston part within the housing, the contact part being linked to the piston part so as to be moveable in translation along the longitudinal axis between:

a rest position in which said contact part is spaced apart from the biasing member when the pressure chamber is empty, a gap existing between the contact part and the biasing member, and an active position in which the contact part is in contact with the biasing member when the pressure chamber is filled with pressurized fluid, so as to let the interface member move towards the disengaged position, and wherein the wear measurement device comprises:

a source of pressurized fluid configured to inject pressurized fluid within the pressure chamber so as to put the contact part of the actuation device in contact with the biasing member, a sensor arrangement configured to measure at least one injection parameter chosen between a pressure and a volume of pressurized fluid while pressurized fluid is injected, the injection parameter being related to the gap between the contact part of the actuation device and the biasing member, a control member suitable for determining the gap between the contact part of the actuation device and the biasing member based on the injection parameter, the gap being representative of wear of the friction disks of the interface member and the first shaft member.

14. The assembly according to claim 13, wherein the sensor arrangement is configured to measure the volume of pressurized fluid injected in the pressure chamber of the actuation device as the injection parameter until an input pressure of pressurized fluid is reached, the input pressure being representative of a contact situation where the contact part of the actuation device is in contact with the biasing member, and wherein the control member of the wear measurement device is configured to associate a value of the volume of pressurized fluid to a value for the gap between the contact part of the actuation device and the biasing member.

15. The assembly according to claim 14, wherein the input pressure is greater than or equal to a maximum pressure on a full range of wear to have the contact part of the actuation device and the biasing member in contact, and lower than or equal to a minimum pressure on the full range of wear to have the interface member in the disengaged position.

16. The assembly according to claim 13, wherein the sensor arrangement is configured to measure the pressure of pressurized fluid injected in the pressure chamber of the actuation device that is reached after an input volume of pressurized fluid has been injected as the injection parameter, the input volume being representative of a contact situation where the contact part of the actuation device is in contact with the biasing member, and wherein the control member of the wear measurement device is configured to associate a value of the pressure of pressurized fluid to a value for the gap between the contact part of the actuation device and the biasing member.

17. The assembly according to claim 16, wherein the input volume is greater than or equal to a maximum volume on a full range of wear to have the contact part of the actuation device and the biasing member in contact, and lower than or equal to a minimum volume on the full range of wear to have the interface member in the disengaged position.

18. The assembly according to claim 13, wherein the wear measurement device is configured to check that the contact part of the actuation device is in the rest position before injecting pressurized fluid within the pressure chamber.

19. The assembly according to claim 18, wherein the wear measurement device further comprises a pumping member configured to apply vacuum to the pressure chamber before injecting pressurized fluid within the pressure chamber.

20. The assembly according to claim 13, wherein the casing includes:
a wall around the longitudinal axis, the wall presenting an inner contact surface cylindrical along the longitudinal axis the wall forming the housing of the actuation device and the piston part of the actuation device being slidably mounted on the inner contact surface,
an access port arranged in the casing and opening into the pressure chamber of the actuation device, the access port being configured to enable the pressure chamber to be filled with pressurized fluid so as to place the contact part of the actuation device in the active position and to be emptied so as to place the contact part of the actuation device in the rest position.

* * * * *